United States Patent
Liu et al.

(10) Patent No.: US 7,805,438 B2
(45) Date of Patent: Sep. 28, 2010

(54) LEARNING A DOCUMENT RANKING FUNCTION USING FIDELITY-BASED ERROR MEASUREMENTS

(75) Inventors: Tie-Yan Liu, Beijing (CN); Ming-Feng Tsai, Taipei (TW); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 11/461,404

(22) Filed: Jul. 31, 2006

(65) Prior Publication Data

US 2008/0027912 A1  Jan. 31, 2008

(51) Int. Cl.
| | |
|---|---|
| G06F 7/00 | (2006.01) |
| G06F 17/30 | (2006.01) |
| G06F 15/18 | (2006.01) |
| G06F 3/00 | (2006.01) |
| G01N 33/48 | (2006.01) |
| G01N 33/50 | (2006.01) |
| G05B 15/00 | (2006.01) |
| G05B 19/42 | (2006.01) |
| G06E 1/00 | (2006.01) |
| G06E 3/00 | (2006.01) |
| G06G 7/00 | (2006.01) |

(52) U.S. Cl. .................. 707/723; 702/19; 700/83; 700/86; 706/21; 715/716

(58) Field of Classification Search .......... 707/3; 702/19
See application file for complete search history.

(56) References Cited

U.S. PATENT DOCUMENTS

| | | | |
|---|---|---|---|
| 6,418,424 B1 * | 7/2002 | Hoffberg et al. | ............ 706/21 |
| 6,654,742 B1 | 11/2003 | Kobayashi et al. | |
| 6,718,324 B2 | 4/2004 | Edlund et al. | |
| 6,735,588 B2 | 5/2004 | Kim et al. | |
| 6,850,252 B1 * | 2/2005 | Hoffberg | ............ 715/716 |

(Continued)

FOREIGN PATENT DOCUMENTS

WO   WO-01/65416   9/2001

(Continued)

OTHER PUBLICATIONS

Klauck, Hartmut; Interaction in quantum communication and the complexity of set disjointness, 2001, ACM, ISBN:1-58113349, pp. 124-127.*

(Continued)

*Primary Examiner*—Neveen Abel Jalil
*Assistant Examiner*—Jermaine Mincey
(74) *Attorney, Agent, or Firm*—Perkins Coie LLP

(57) ABSTRACT

A method and system for generating a ranking function using a fidelity-based loss between a target probability and a model probability for a pair of documents is provided. A fidelity ranking system generates a fidelity ranking function that ranks the relevance of documents to queries. The fidelity ranking system operates to minimize a fidelity loss between pairs of documents of training data. The fidelity loss may be derived from "fidelity" as used in the field of quantum physics. The fidelity ranking system may use a learning technique in conjunction with a fidelity loss when generating the ranking function. After the fidelity ranking system generates the fidelity ranking function, it uses the fidelity ranking function to rank the relevance of documents to queries.

19 Claims, 6 Drawing Sheets

U.S. PATENT DOCUMENTS

| | | | |
|---|---|---|---|
| 6,925,433 | B2 | 8/2005 | Stensmo |
| 7,028,020 | B1 | 4/2006 | Keskar et al. |
| 2002/0038307 | A1* | 3/2002 | Obradovic et al. .......... 707/102 |
| 2005/0149504 | A1 | 7/2005 | Ratnaparkhi |
| 2005/0278288 | A1 | 12/2005 | Plow et al. |
| 2005/0278321 | A1* | 12/2005 | Vailaya et al. ................. 707/3 |
| 2005/0289102 | A1 | 12/2005 | Das et al. |
| 2006/0015263 | A1* | 1/2006 | Stupp et al. ................... 702/19 |
| 2006/0053101 | A1* | 3/2006 | Stuart et al. ..................... 707/3 |
| 2006/0064411 | A1* | 3/2006 | Gross et al. ..................... 707/3 |
| 2006/0106762 | A1* | 5/2006 | Caracas et al. ................. 707/3 |
| 2006/0155398 | A1* | 7/2006 | Hoffberg et al. .............. 700/86 |
| 2008/0069663 | A1 | 3/2008 | Adar et al. |

FOREIGN PATENT DOCUMENTS

| | | |
|---|---|---|
| WO | WO-2006/047654 | 5/2006 |

OTHER PUBLICATIONS

Bussiere, Matthieu; Low probability, high impact: policy making and extreme events, Sep. 2004, pp. 3.*

Savitha Srinivasan; Phonetic Confusion Matrix Based; 2000; ACM; pp. 1-7.*

Baeza-Yates, Ricardo et al., Table of Contents and Ch. 3 of Modern Information Retrieval, copyright 1999 ACM Press, New York, pp. 73-97.

Bartell, Brian Theodore, Optimizing Ranking Functions: A Connectionist Approach to Adaptive Information Retrieval, © 1994, University of California, San Diego dissertation.

Baum, Eric et al., "Supervised Learning of Probability Distributions by Neural Networks," Neural Information Processing Systems, copyright 1988 American Institute of Physics, New York, pp. 52-61.

Borlund, Pia, "The Concept of Relevance in IR," Journal of the American Society for Information Science and Technology, 54(10), pp. 913-925, 2003, © 2003 Wiley Periodicals, Inc.

Boyan, Justin et al., "A Machine Learning Architecture for Optimizing Web Search Engines," Carnegie Mellon University, May 10, 1996, To appear in AAAI Workshop on Internet-Based Information Systems, Portland, Oregon, 1996.

Brin, Sergey and Lawrence Page, "The Anatomy of a Large-Scale Hypertextual Web Search Engine," 1998, Computer Networks and ISDN Systems, Stanford University paper.

Burges, Chris et al., "Learning to Rank using Gradient Descent," Proceedings of the 22nd International Conference on Machine Learning, Bonn, Germany, 2005.

Crammer, Koby and Yoram Singer, "Pranking with Ranking," 2002, Advances in Neural Information Processing Systems 14.

Dekel, Ofer et al, "Log-Linear Models for Label Ranking," Advances in Neural Information Processing Systems 2003.

Freund, Yoav et al., "An Efficient Boosting Algorithm for Combining Preferences," Journal of Machine Learning Research 4, 2003, pp. 933-969, © 2003 authors.

Friedman, Jerome et al., "Additive Logisitic Regression: a Statistical View of Boosting," Aug. 20, 1998, Annals of Statistics, 2000.

Guttman, Louis, "What Is Not What In Statistics," The Statistician, vol. 28, No. 2, Jun. 1977, pp. 81-107.

Herbrich, Ralf et al., "Large Margin Rank Boundaries for Ordinal Regression," Advances in Large Margin Classifiers, 2000.

Jarvelin, Kalervo et al, "Cumulated Gain-Based Evaluation of IR Techniques," ACM Transactions on Information Systems, vol. 20, No. 4, Oct. 2002, pp. 422-446, © 2002 ACM.

Jarvelin, Kalervo et al, "IR evaluation methods for retrieving highly relevant documents," SIGIR 2000, Athens, Greece, © 2000 ACM, pp. 41-48.

Joachims, Thorsten, "Making Large-Scale SVM Learning Practical," Advances in Kernel Methods—Support Vector Learning, MIT Press, Cambridge, USA, 1998.

Joachims, Thorsten, "Optimizing Search Engines using Clickthrough Data," SIGKDD 2002, Edmonton, Alberta, Canada, © 2002 ACM, pp. 133-142.

Lafferty, John and Chengxiang Zhai, "Document Language Models, Query Models, and Risk Minimization for Information Retrieval," SIGIR 2001, New Orleans, Louisiana, © 2001 ACM.

Nallapati, Ramesh, "Discriminative Models for Information Retrieval," SIGIR'04, South Yorkshire, UK, © 2004 ACM, pp. 64-71.

Richardson, Matthew and Pedro Domingos, "The Intelligent Surfer: Probabilistic Combination of Link and Content Information in PageRank," NIPS 14, 2002.

Robertson, S.E. and S. Walker, "Some Simple Effective Approximations to the 2-Poisson Model for Probabilistic Weighted Retrieval," In Proceedings of SIGIR-94, pp. 232-241, 1994.

Sormunen, Eero, "Liberal Relevance Criteria of TREC—Counting on Negligible Documents?," SIGIR'02, Tampere, Finland, © 2002 ACM.

* cited by examiner

LEARNING A DOCUMENT RANKING FUNCTION USING FIDELITY-BASED ERROR MEASUREMENTS

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

The success of the search engine service may depend in large part on its ability to rank web pages in an order that is most relevant to the user who submitted the query. Search engine services have used many machine learning techniques in an attempt to learn a good ranking function. The learning of a ranking function for a web-based search is quite different from traditional statistical learning problems such as classification, regression, and density estimation. The basic assumption in traditional statistical learning is that all instances are independently and identically distributed. This assumption, however, is not correct for web-based searching. In web-based searching, the rank of a web page of a search result is not independent of the other web pages of the search result, but rather the ranks of the web pages are dependent on one another.

Several machine learning techniques have been developed to learn a more accurate ranking function that factors in the dependence of the rank of one web page on the rank of another web page. For example, a RankSVM algorithm, which is a variation of a generalized Support Vector Machine ("SVM"), attempts to learn a ranking function that preserves the pairwise partial ordering of the web pages of training data. A RankSVM algorithm is an ordinal regression technique to minimize the number of incorrectly ranked pairs. A RankSVM algorithm is described in Joachims, T., "Optimizing Search Engines Using Clickthrough Data," Proceedings of the ACM Conference on Knowledge Discovery and Data Mining ("KDD"), ACM, 2002. Another example of a technique for learning a ranking function is a RankBoost algorithm. A RankBoost algorithm is an adaptive boosting algorithm that, like a RankSVM algorithm, operates to preserve the ordering of pairs of web pages. A RankBoost algorithm attempts to directly solve a preference learning. A RankBoost algorithm is described in Freund, Y., Iyer, R., Schapire, R., and Singer, Y., "An Efficient Boosting Algorithm for Combining Preferences," Journal of Machine Learning Research, 2003(4). As another example, a neural network algorithm, referred to as RankNet, has been used to rank web pages. A RankNet algorithm also operates to preserve the ordering of pairs of web pages and models the ordinal relationship between two documents using a probability. A RankNet algorithm is described in Burges, C., Shaked, T., Renshaw, E., Lazier, A., Deeds, M., Hamilton, N., and Hullender, G., "Learning to Rank Using Gradient Descent," 22nd International Conference on Machine Learning, Bonn, Germany, 2005.

These machine learning techniques attempt to learn a ranking function by operating on document (e.g., web page) pairs to minimize an error function between these pairs. A RankNet algorithm uses cross entropy to measure the distance between two probability distributions. Although RankNet may provide efficient retrieval performance, the use of a cross entropy loss function has several disadvantages. First, a cross entropy loss function cannot achieve a minimal loss of 0 except when the target probability is 0 or 1, which results in corresponding inaccuracies in the ranking function. Second, a cross entropy loss function has no upper bound for the loss of a pair of documents. Because the loss for a pair that is incorrectly ranked may be too high, the ranking function based on a cross entropy loss may be biased by some pairs that are difficult to correctly rank.

SUMMARY

A method and system for generating a ranking function using a fidelity-based loss between a target probability and a model probability for a pair of documents is provided. A fidelity ranking system generates a fidelity ranking function that ranks the relevance of documents to queries. The fidelity ranking system operates to minimize a fidelity loss between pairs of documents of training data. The training data includes documents along with an indication of a target (or posterior) probability of the relative relevance of pairs of documents to queries. The fidelity loss may be derived from "fidelity" as used in the field of quantum physics. Since the fidelity ranking function provides a ranking of documents rather than a probability, the fidelity ranking system when generating a fidelity ranking function may apply a logistic function to the ranking of a pair of documents to calculate a model probability that is used to calculate the fidelity loss. The fidelity ranking system may use a learning technique in conjunction with a fidelity loss when generating the ranking function. After the fidelity ranking system generates the fidelity ranking function, it uses the fidelity ranking function to rank the relevance of documents to queries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
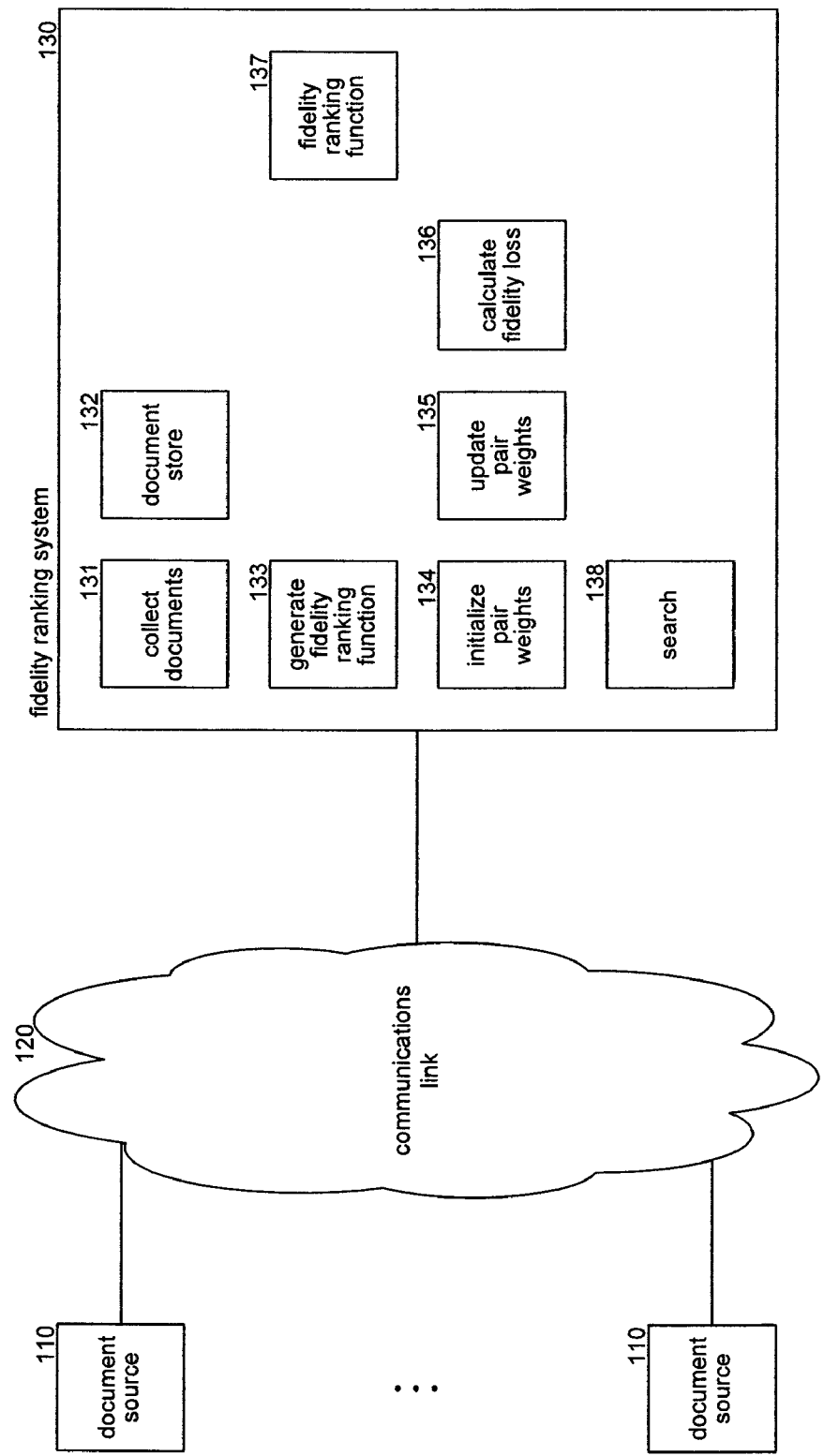
FIG. 1 is a block diagram that illustrates components of the fidelity ranking system in one embodiment.

A method and system for generating a ranking function using a fidelity-based loss between a target probability and a model probability for a pair of documents is provided. In one embodiment, a fidelity ranking system generates a fidelity ranking function that ranks the relevance of documents to queries. The fidelity ranking system operates to minimize a fidelity loss between pairs of documents of training data. The training data includes documents along with an indication of a target (or posterior) probability of the relative relevance of pairs of documents to queries. A fidelity loss is an error between a calculated model probability generated by the fidelity ranking function and the target probability for a pair of documents. The fidelity loss may vary between 0 and 1 with the loss being 0 when the calculated model probability is the same as the target probability. The fidelity loss may be derived from "fidelity" as used in the field of quantum physics as described in Nielsen, M. A., and Chuang, I. L., "Quantum Computation and Quantum information," Cambridge University Press, 2000, which is hereby incorporated by reference. Since the fidelity ranking function provides a ranking of documents rather than a probability, the fidelity ranking system when generating the ranking function applies a logistic function to the ranking of a pair of documents to calculate a model probability that is used to calculate the fidelity loss. The fidelity ranking system may use an adaptive boosting technique, a neural network technique, a support vector machine, or other learning technique in conjunction with a fidelity loss. After the fidelity ranking system generates a fidelity ranking function, it uses the fidelity ranking function to rank the relevance of documents to queries. Because a fidelity loss varies between 0 and 1, the fidelity ranking function is not overly biased by pairs of documents that are very difficult to rank. In addition, because a fidelity loss can accurately represent a 0 loss whenever a model probability is the same as a target probability, the fidelity ranking function may be more accurate than a ranking function generated based on a cross entropy loss, such as RankNet.

In one embodiment, the fidelity ranking system generates a fidelity ranking function using an adaptive boosting technique. Adaptive boosting is an iterative process that runs multiple tests on a collection of training data having examples. Adaptive boosting transforms a weak learning algorithm (an algorithm that performs at a level only slightly better than chance) into a strong learning algorithm (an algorithm that displays a low error rate). The weak learning algorithm may run on different subsets of the training data. The algorithm concentrates more and more on those examples in which its predecessors tended to show mistakes. The algorithm corrects the errors made by earlier weak learning algorithms. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier or ranking function.

To generate a fidelity ranking function, the fidelity ranking system performs a series of iterations that each selects a weak learning algorithm and its optimal weight to combine with other weak learning algorithms and weights selected during other iterations. The fidelity ranking system initially assigns a weight to each pair of documents. The weight for a pair of documents indicates how much the training is to concentrate on ensuring that the model probability is the same as the target probability for that pair of documents. Initially, the fidelity ranking system may set the weights for all the pairs of documents associated with a query to an equal amount. For example, if the training data includes a query with 20 pairs of documents with a target probability indicating relevance of each pair of document to the query, then the fidelity ranking system may set the weight of each pair to 1/20. During each iteration, the fidelity ranking system calculates for each candidate weak learning algorithm an optimal weight along with the fidelity loss that would occur if that algorithm was added to the fidelity ranking function. The fidelity ranking system may define several different candidate weak learning algorithms. For example, one candidate weak learning algorithm may generate a 1 when a document contains a query term. Another candidate weak learning algorithm may generate a 1 when a document contains a query term in its title. Yet another candidate weak learning algorithm may generate a score between 0 and 100 indicating importance of a query term to a document using a term frequency by inverse document frequency ("TD*IDF") metric. When calculating the optimal weight, the fidelity ranking system factors in the weights of the pairs of documents so that the training can concentrate on pairs of documents whose fidelity loss was higher during the previous iteration. The fidelity ranking system then adds the candidate weak learning algorithm with the smallest fidelity loss along with its optimal weight to the fidelity ranking function. The fidelity ranking system then updates the weights for each pair of documents so that during the next iteration the training can concentrate on pairs of documents with a higher fidelity loss.

To rank the documents of a query result, the fidelity ranking system ranks the relevance of each document to the query. To rank the relevance of a document, the fidelity ranking system inputs the document and the query to the fidelity ranking function. The fidelity ranking function performs the weak learning algorithm selected during each iteration to generate an output for each algorithm. The fidelity ranking system multiplies the outputs of each weak learning algorithm by the optimal weight that was calculated during each iteration. The ranking system then adds the weighted outputs to provide a score indicating the overall ranking of the document. The fidelity ranking system may then order the documents of the query result based on their score to provide the ranking of the relevance of the documents to the query.

In one embodiment, the fidelity ranking system may use a fidelity loss in conjunction with a support vector machine to generate a fidelity ranking function. A support vector machine operates by finding a hyper-surface in the space of possible inputs. The hyper-surface attempts to split the positive examples (e.g., feature vectors for data tables) from the negative examples (e.g., feature vectors for layout tables) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

In one embodiment, the fidelity ranking system may use a fidelity loss in conjunction with a neural network to generate a fidelity ranking function. A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

As described above, the fidelity ranking system uses a logistic function to convert the outputs of the fidelity ranking function for a pair of documents to a probability. A logistic function generates a value between 0 and 1 with an S-shaped curve. The initial growth of the curve is approximately exponential, which slows over time. The fidelity ranking system may represent the logistic function by the following equation:

$$P_{ij} = \frac{e^{o_{ij}}}{1+e^{o_{ij}}} \quad (1)$$

where $P_{ij}$ represents the probability that document i is ranked higher than document j and $o_{ij}$ represents the difference between the outputs of the fidelity ranking function for document i and document j as represented by $f(d_i)-f(d_j)$ with $f(d_i)$ being the output of the fidelity ranking function for document i.

Fidelity is a distance metric used in quantum physics to measure the difference between two states of a quantum. The fidelity of two probability distributions is represented by the following equation:

$$F(p_x, q_x) \equiv \sum_x \sqrt{p_x q_x} \quad (2)$$

where $p_x$ and $q_x$ represent the probability distributions. When the probability distributions are the same, then the result of Equation 2 is 1. The fidelity can also be considered as the inner product between vectors with components that are the square root of the probability distributions that lie on a unit sphere. In one embodiment, the fidelity ranking system represents fidelity loss by the following equation:

$$F_{ij} \equiv F(o_{ij}) = 1 - (\sqrt{P_{ij}^* \cdot P_{ij}} + \sqrt{(1-P_{ij}^*) \cdot (1-P_{ij})}) \quad (3)$$

where $F_{ij}$ represents the fidelity loss for the pair of documents i and j and $P_{ij}^*$ represents the target probability for documents i and j. When the logistic function is used to convert the output of the fidelity ranking function to a probability, the fidelity loss is represented by the following equation:

$$F_{ij} = 1 - \left( \left[ P_{ij}^* \times \left( \frac{e^{o_{ij}}}{1+e^{o_{ij}}} \right) \right]^{\frac{1}{2}} + \left[ (1-P_{ij}^*) \times \left( \frac{1}{1+e^{o_{ij}}} \right) \right]^{\frac{1}{2}} \right). \quad (4)$$

The fidelity ranking system may weight each query equally when generating the fidelity ranking function regardless of the number of pairs of documents for the query in the training data. The equal weighting helps ensure that queries with many document pairs do not overwhelm queries with few document pairs when generating the fidelity ranking function. To help ensure this equal weighting, the fidelity ranking system weights the fidelity loss of a pair of documents according to the following equation:

$$\sum_q \frac{1}{|\#_q|} \sum_{ij} F_{ij} \quad (5)$$

where $\#_q$ represents the number of pairs of documents for query q.

The fidelity ranking system represents the final fidelity ranking function by the following equation:

$$H(x) = \sum_t \alpha_t h_t(x) \quad (6)$$

where H(x) represents the output for document x, $\alpha_t$ represents the optimal weight for the weak learning algorithm selected during iteration t, and $h_t$ represents the weak learning algorithm selected during iteration t. The fidelity ranking system represents the fidelity ranking function after the $k^{th}$ iteration by the following equation:

$$H_k(x) = \sum_{t=1}^k \alpha_t h_t(x) \text{ or } H_k(x) = H_{k-1}(x) + \alpha_k h_k(x). \quad (7)$$

The fidelity ranking system represents the fidelity loss over all queries by the following equation:

$$J(H_k) = \sum_q \frac{1}{|\#_q|} \sum_{ij} F_{ij}^{(k)} \quad (8)$$

$$= \sum_q \frac{1}{|\#_q|} \sum_{ij} \left( 1 - \left[ P_{ij}^* \times \left( \frac{e^{H_k(x_i)-H_k(x_j)}}{1+e^{H_k(x_i)-H_k(x_j)}} \right) \right]^{\frac{1}{2}} - \left[ (1-P_{ij}^*) \times \left( \frac{1}{1+e^{H_k(x_i)-H_k(x_j)}} \right) \right]^{\frac{1}{2}} \right).$$

Equation 8 can be represented with only the following equation:

$$J(H_k) = \sum_q \frac{1}{|\#_q|} \sum_{ij} \left( 1 - \left[ P_{ij}^* \times \left( \frac{e^{H_{k-1}^{i,j}+\alpha_k h_k^{i,j}}}{1+e^{H_{k-1}^{i,j}+\alpha_k h_k^{i,j}}} \right) \right]^{\frac{1}{2}} - \left[ (1-P_{ij}^*) \times \left( \frac{1}{1+e^{H_{k-1}^{i,j}+\alpha_k h_k^{i,j}}} \right) \right]^{\frac{1}{2}} \right) \quad (9)$$

where $H_{k-1}^{i,j}$ and $h_k^{i,j}$ are represented by the following equations:

$$H_{k-1}^{i,j} \triangleq H_{k-1}(x_i)-H_{k-1}(x_j) \text{ and } h_k^{i,j} \triangleq h_k(x_i)-h_k(x_j) \quad (10)$$

The fidelity ranking system represents the fidelity loss over all queries adjusted to factor out the number of pairs of documents associated with each query by the following equation:

$$J(H_k) = \sum_{ij} D(i,j) \times \left(1 - \left[P_{ij}^* \times \left(\frac{e^{H_{k-1}^{i,j}+\alpha_k h_k^{i,j}}}{1+e^{H_{k-1}^{i,j}+\alpha_k h_k^{i,j}}}\right)\right]^{\frac{1}{2}} - \left[(1-P_{ij}^*) \times \left(\frac{1}{1+e^{H_{k-1}^{i,j}+\alpha_k h_k^{i,j}}}\right)\right]^{\frac{1}{2}}\right) \quad (11)$$

where D(i,j) is represented by the following equation:

$$D(i,j) = \frac{1}{|\#_q|}. \quad (12)$$

The fidelity ranking system sets the derivative of Equation 11 with respect to $\alpha_k$ to 0 as represented by the following equation:

$$\frac{\partial J(H_k)}{\partial \alpha_k} = \sum_{ij} D(i,j) \cdot \left( \begin{array}{c} -\frac{1}{2}\left[P_{ij}^* \times \left(\frac{e^{H_{k-1}^{i,j}+\alpha_k h_k^{i,j}}}{1+e^{H_{k-1}^{i,j}-\alpha_k h_k^{i,j}}}\right)\right]^{\frac{1}{2}} \\ \left[P_{ij}^* \times \frac{h_k^{ij} \cdot e^{H_{k-1}^{i,j}+\alpha_k h_k^{i,j}}}{\left(1+e^{H_{k-1}^{i,j}+\alpha_k h_k^{i,j}}\right)}\right] \\ -\frac{1}{2}\left[(1-P_{ij}^*)\times\left(\frac{1}{1+e^{H_{k-1}^{i,j}+\alpha_k h_k^{i,j}}}\right)\right]^{-\frac{1}{2}} - \\ \left[(1-P_{ij}^*) \times \frac{-h_k^{i,j} \cdot e^{H_{k-1}^{i,j}+\alpha_k h_k^{i,j}}}{\left(1+e^{H_{k-1}^{i,j}+\alpha_k h_k^{i,j}}\right)^2}\right] \end{array} \right)$$

$$= 0 \quad (13)$$

Since a solution for the closed form for $\alpha_k$ for a general weak learning algorithm $h_t(x)$ is difficult, the fidelity ranking system may use binary weak learning algorithms to construct the final fidelity ranking function. When binary weak learning algorithms are used, the fidelity ranking system can represent Equation 13 by the following equation:

$$\sum_{h_k^{i,j}=1} = D(i,j) \cdot \left( \frac{\left(P_{ij}^* \cdot e^{H_{k-1}^{i,j}}\right)^{\frac{1}{2}} \cdot e^{-\alpha_k}}{\left(e^{-\alpha_k}+e^{H_{k-1}^{i,j}}\right)^{\frac{3}{2}}} - \frac{e^{H_{k-1}^{i,j}} \cdot (1-P_{ij}^*)^{\frac{1}{2}} \cdot e^{-\alpha_k}}{\left(e^{-\alpha_k} \cdot \left(e^{-\alpha_k}+e^{H_{k-1}^{i,j}}\right)^3\right)^{\frac{1}{2}}} \right) \quad (14)$$

$$= \sum_{h_k^{i,j}=-1} D(i,j) \cdot \left( \frac{\left(P_{ij}^* \cdot e^{H_{k-1}^{i,j}}\right)^{\frac{1}{2}} \cdot e^{-\alpha_k}}{\left(e^{\alpha_k}+e^{H_{k-1}^{i,j}}\right)^{\frac{3}{2}}} - \frac{e^{H_{k-1}^{ij}} \cdot (1-P_{ij}^*)^{\frac{1}{2}} \cdot e^{\alpha_k}}{\left(e^{\alpha_k} \cdot \left(e^{\alpha_k}+e^{H_{k-1}^{i,j}}\right)^3\right)^{\frac{1}{2}}} \right)$$

because $h_k^{i,j}$ only has the values of −1, 0, or 1. To simplify Equation 14, the fidelity ranking system may make the assumption that $\alpha_k$ tends to zero over many iterations. As a result, $e^{\alpha_k}$ and $e^{-\alpha_k}$ tend to 1. Therefore, the fidelity ranking system may make the assumption that $e^{\alpha_k}$ and $e^{-\alpha_k}$ are equal to 1. Thus, the fidelity ranking system represents the optimal weight for a weak learning algorithm at each iteration by the following equation:

$$\alpha_k = \frac{1}{2}\ln\frac{\sum_{h_k^{i,j}=1} W_{i,j}}{\sum_{h_k^{i,j}=-1} W_{i,j}} \quad (15)$$

where $\alpha_k$ represents the optimal weight for a weak learning algorithm at iteration k and $W_{i,j}$ represents the weights for the pair of documents i and j. The fidelity ranking system also represents the weight for a pair of documents for iteration k by the following equation:

$$W_{i,j} = D(i,j) \cdot \left( \frac{\left(P_{ij}^* \cdot e^{H_{k-1}^{i,j}}\right)^{\frac{1}{2}} - e^{H_{k-1}^{i,j}} \cdot (1-P_{ij}^*)^{\frac{1}{2}}}{\left(1-e^{H_{k-1}^{i,j}}\right)^{\frac{3}{2}}} \right). \quad (16)$$

FIG. 1 is a block diagram that illustrates components of the fidelity ranking system in one embodiment. The fidelity ranking system 130 is connected to document sources 110 via communications link 120. The document sources may be web pages, document stores (e.g., a collection of journal articles), news feeds, electronic mail messages, files, and so on. In general, a document can be any collection of information. The fidelity ranking system includes a collect documents component 131 and a document store 132. The collect documents component collects documents from the document sources to be used as training data when generating a fidelity ranking function. The collect documents component may submit the queries of the training data to a search engine and receive an indication of the documents that match each query. The collect documents component may then retrieve each document and generate a feature vector to represent each document. The collect documents component then stores the queries in association with the feature vectors representing the documents returned by the search engine. The collect documents component may also receive from a user for each pair of documents a target probability that the first document of the pair should be ranked higher than the second document of the pair. The queries, feature vectors, and target probability form the training data used to generate the fidelity ranking function.

The fidelity ranking system also includes a generate fidelity ranking function component 133 that invokes an initialize pair weights component 134, an update pair weights component 135, and a calculate fidelity loss component 136. The generate fidelity ranking function component uses the training data to generate the fidelity ranking function. The initialize pair weights component initializes the weights of each pair of documents based on the number of pairs of documents associated with each query. The update pair weights component updates the weights of each pair of documents so that the training can concentrate on pairs of documents whose fidelity loss is higher. The calculate fidelity loss component calculates the fidelity loss for a pair of documents. The generate fidelity ranking function component generates a fidelity ranking function 137. The fidelity ranking system also includes a search component 138 that receives a query, identifies matching documents, and then ranks the matching documents using the fidelity ranking function.

The computing devices on which the fidelity ranking system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the fidelity ranking system. In addition, the data structures and modules of the fidelity ranking system may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the fidelity ranking system may be implemented in various operating environments that include personal computers, server computers, multiprocessor systems, microprocessor-based systems, network PCs, minicomputers, mainframe computers, distributed computing environments that include any of the above systems or devices, and so on.

The fidelity ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the collect documents component, the generate fidelity ranking function component, and the search component may all be implemented on separate computing systems.

Figure 2:
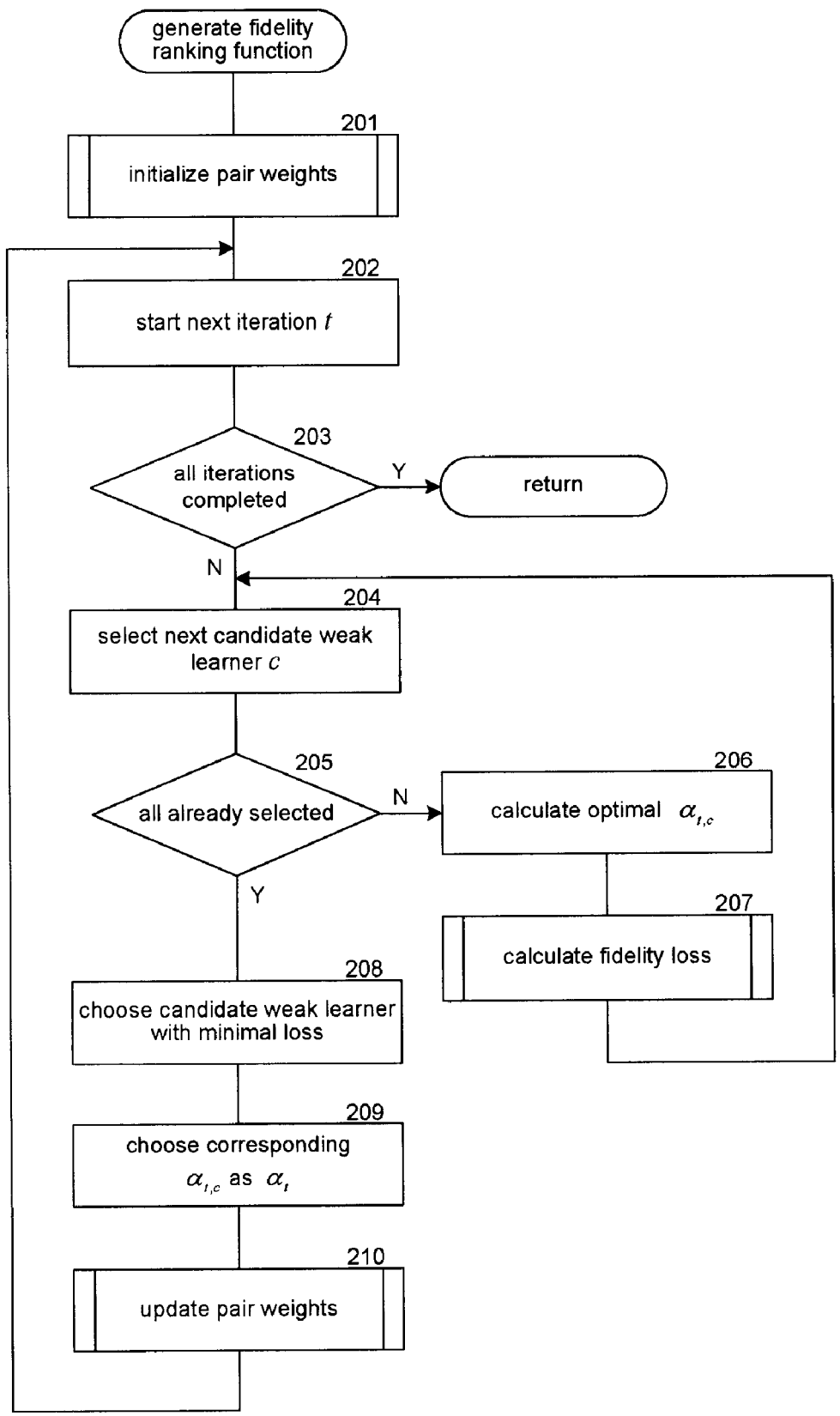
FIG. 2 is a flow diagram illustrating the processing of the generate fidelity ranking function component of the fidelity ranking system in one embodiment.

FIG. 2 is a flow diagram illustrating the processing of the generate fidelity ranking function component of the fidelity ranking system in one embodiment. The component generates a fidelity ranking function using training data that includes queries, documents of the query results, and target probabilities for pairs of documents. The component loops for each iteration of the training to select a weak learning algorithm to be added to the fidelity ranking function along with an optimal weight. The component also adjusts the weights for each pair of documents to concentrate the training on incorrectly ranked pairs of documents. In block 201, the component invokes the initialize pair weights component to set the initial weights for each pair of documents. In blocks 202-210, the component loops performing each iteration. In block 202, the component starts the next iteration. In decision block 203, if all the iterations have already been completed, then the component returns, else the component continues at block 204. In blocks 204-207, the component loops selecting each candidate weak learning algorithm and calculating its optimal weight and the associated fidelity loss. In block 204, the component selects the next candidate weak learning algorithm. In decision block 205, if all the candidate weak learning algorithms have already been selected, then the component continues at block 208, else the component continues at block 206. In block 206, the component calculates the optimal weight for the selected candidate weak learning algorithm using Equation 15. In block 207, the component calculates the aggregate fidelity loss for all pairs of documents assuming the selected candidate weak learning algorithm is added to the final fidelity ranking function by invoking the calculate fidelity loss component. The component then loops to block 204 to select the next candidate weak learning algorithm. In block 208, the component chooses the candidate weak learning algorithm that results in the minimum fidelity loss to add to the final fidelity ranking function. In block 209, the component chooses the corresponding weight associated with the chosen candidate weak learning algorithm to add to the final fidelity ranking function. In block 210, the component invokes the update pair weights component to update the weights for each pair of documents based on the new final fidelity ranking function. The component then loops to block 202 to start the next iteration.

Figure 3:
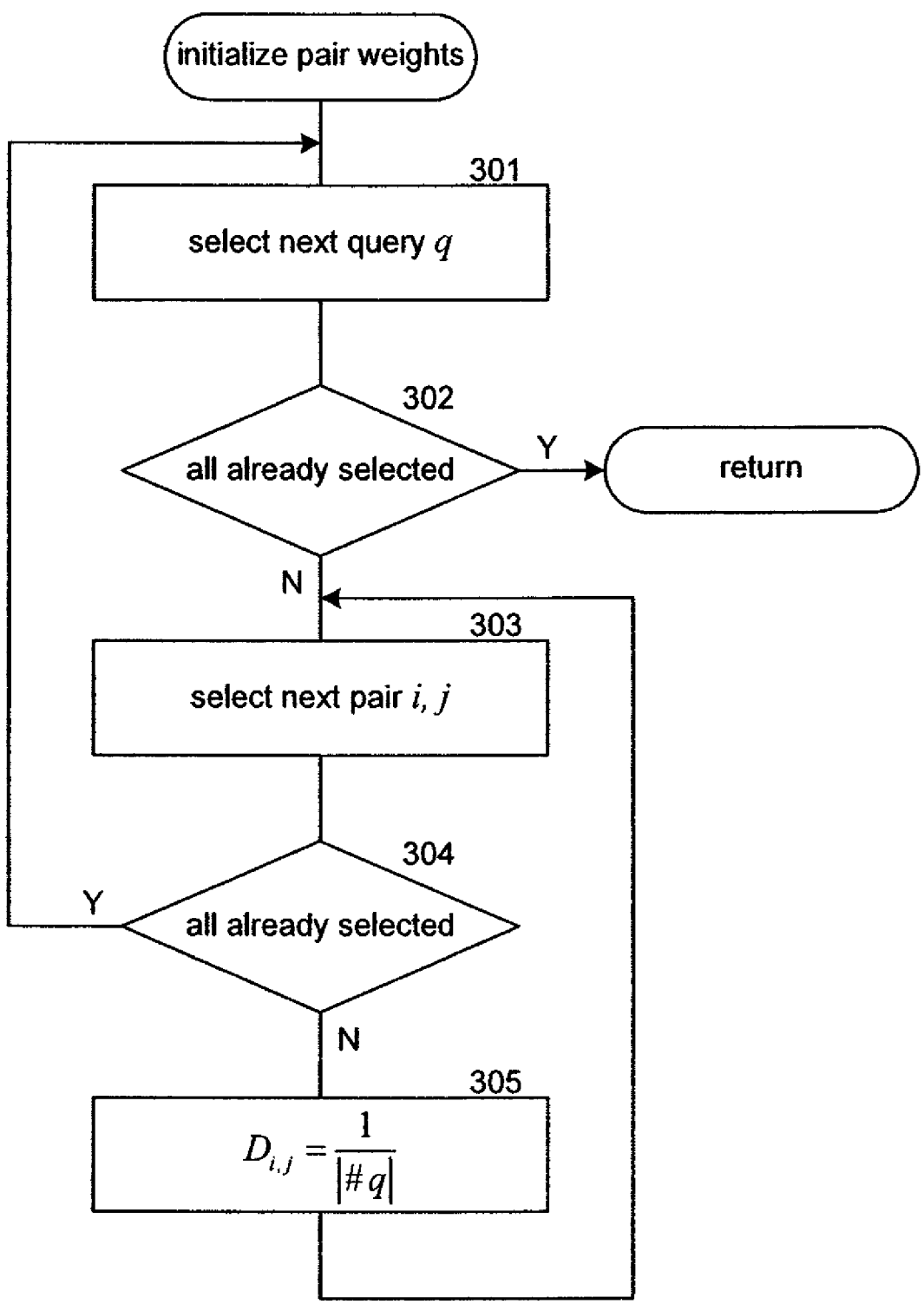
FIG. 3 is a flow diagram that illustrates the processing of the initialize pair weights component of the fidelity ranking system in one embodiment.

FIG. 3 is a flow diagram that illustrates the processing of the initialize pair weights component of the fidelity ranking system in one embodiment. The component initializes the weights for each pair of documents based on the number of pairs of documents associated with the query. In block 301, the component selects the next query of the training data. In decision block 302, if all the queries have already been selected, then the component returns, else the component continues at block 303. In block 303, the component selects the next pair of documents associated with the selected query. In decision block 304, if all the pairs of documents associated with the selected query have already been selected, then the component loops to block 301 to select the next query, else the component continues at block 305. In block 305, the component sets the initial weight for the selected pair of documents to one divided by the number of pairs of documents associated with the selected query. The component then loops to block 303 to select the next pair of documents for the selected query.

Figure 4:
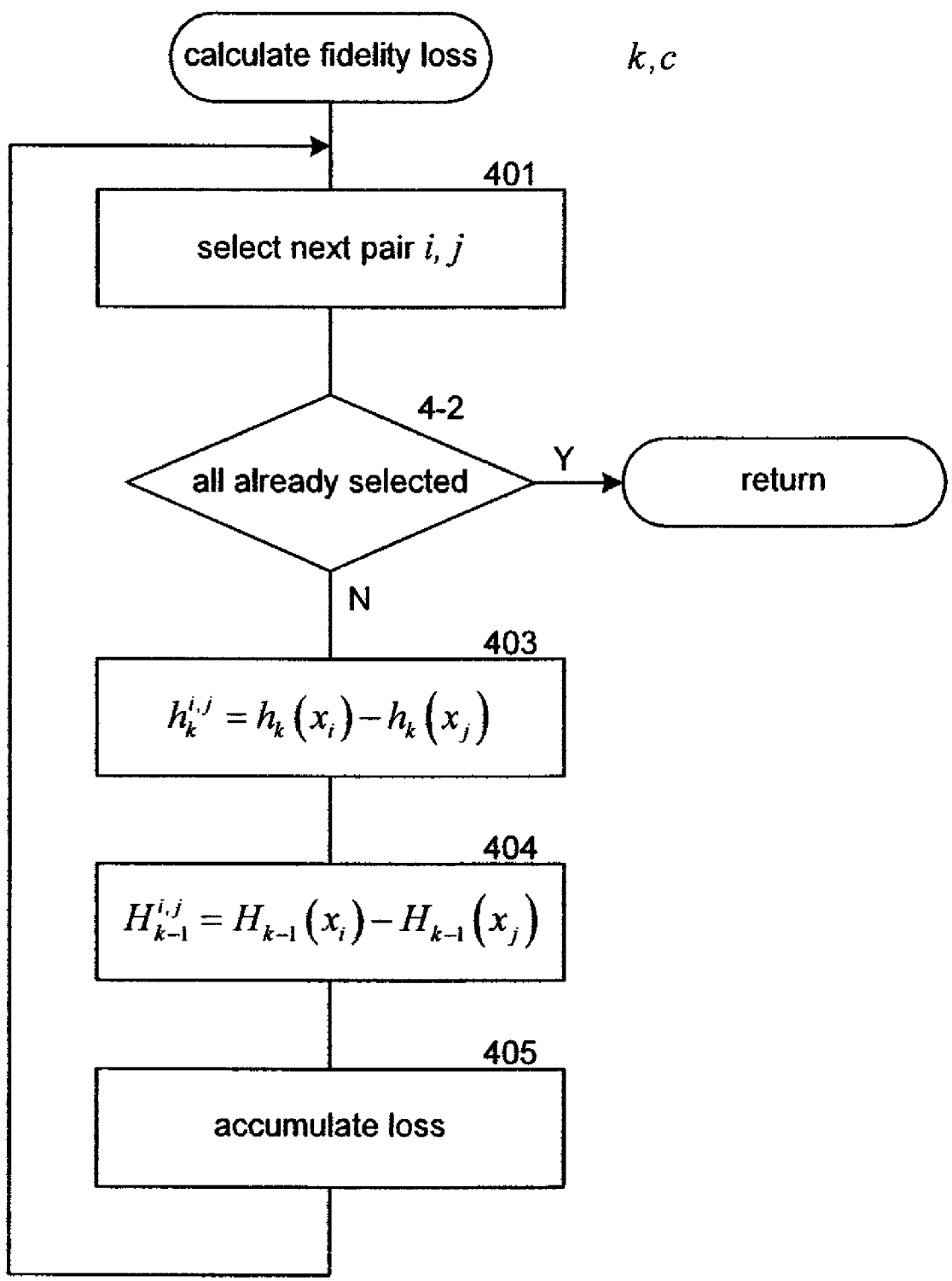
FIG. 4 is a flow diagram that illustrates the processing of the calculate fidelity loss component of the fidelity ranking system in one embodiment.

FIG. 4 is a flow diagram that illustrates the processing of the calculate fidelity loss component of the fidelity ranking system in one embodiment. The component calculates the fidelity loss if the selected candidate weak learning algorithm were added to the fidelity ranking function during the current iteration. In block 401, the component selects the next pair of documents. In decision block 402, if all the pairs of documents have already been selected, then the component returns, else the component continues at block 403. In block 403, the component calculates the difference between the outputs of the selected candidate weak learning algorithm for the documents of the selected pair. In block 404, the component calculates the difference between the outputs of the fidelity ranking function generated so far for the documents of the selected pair. In block 405, the component accumulates the fidelity loss for all pairs of documents for the selected candidate weak learning algorithm for the current iteration as represented by Equation 11. The component then loops to block 401 to select the next pair of documents.

Figure 5:
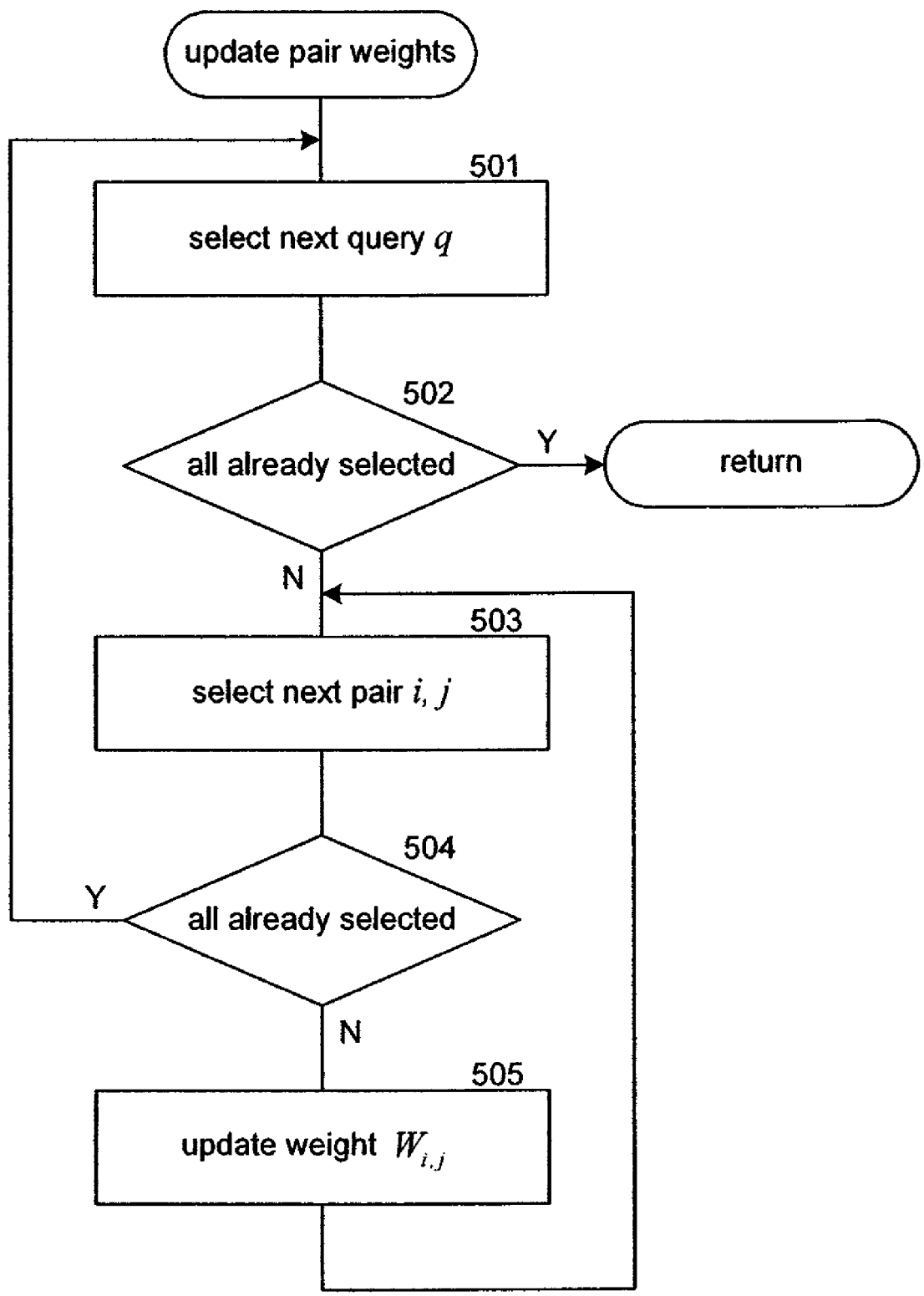
FIG. 5 is a flow diagram that illustrates the processing of the update pair weights component of the fidelity ranking system in one embodiment.

FIG. 5 is a flow diagram that illustrates the processing of the update pair weights component of the fidelity ranking system in one embodiment. The component updates the weights associated with each pair of documents so that the training can concentrate on pairs that are incorrectly ranked. In block 501, the component selects the next query. In decision block 502, if all the queries have already been selected, then the component returns, else the component continues at block 503. In block 503, the component selects the next pair of documents for the selected query. In decision block 504, if all the pairs of documents have already been selected for the selected query, then the component loops to block 501 to select the next query, else the component continues at block 505. In block 505, the component updates the weight for the selected pair of documents using Equation 16. The component then loops to block 503 to select the next pair of documents for the selected query.

Figure 6:
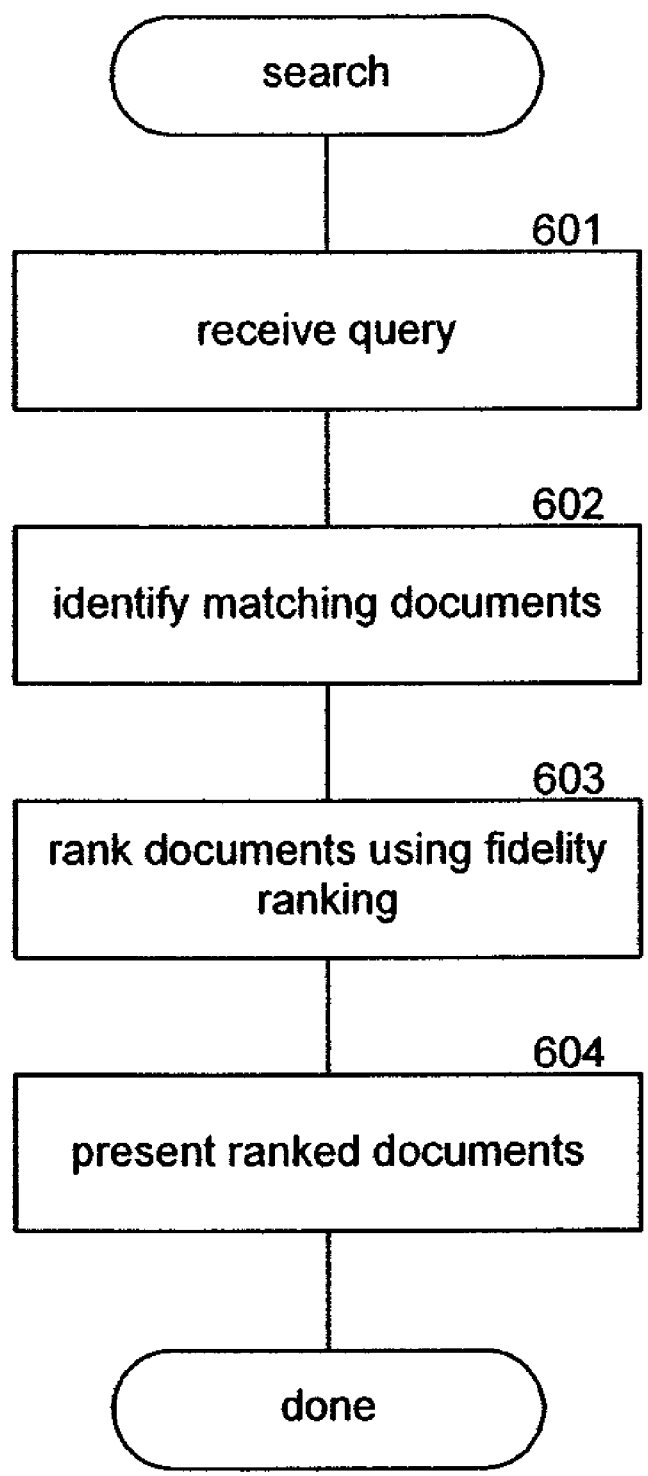
FIG. 6 is a flow diagram that illustrates the processing of the search component of the fidelity ranking system in one embodiment.

FIG. 6 is a flow diagram that illustrates the processing of the search component of the fidelity ranking system in one embodiment. The search component receives a query and presents results of the query ranked using the fidelity ranking function. In block 601, the component receives the query. In decision block 602, the component identifies the matching documents, for example, using conventional search techniques. In block 603, the component ranks the documents using the fidelity ranking function generated by the fidelity ranking system. In block 604, the component presents the ranked documents, for example, to a user and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for determining loss between a target probability and a model probability for documents when training a ranking function based on training data, the training data including documents and the target probability of relative relevance of pairs of documents to queries, the model probability being generated by a ranking function that ranks documents, the method comprising:

training the ranking function by repeating the following until a calculated loss is below a threshold loss:
selecting a new ranking function by modifying a previous ranking function to reduce the calculated loss;
applying the new ranking function to the pairs of documents of the training data to provide new rankings of the documents based on the queries;
calculating by the computing device a model probability from the new rankings of the documents; and
calculating by the computing device a loss between the calculated model probability and the target probability to indicate a difference between the new ranking of a pair of documents represented by the calculated model probability and a ranking of the pair of documents represented by the target probability, the loss varying between 0 and 1 and the loss being 0 when the calculated model probability is the same as the target probability
wherein the calculated loss is a fidelity loss and
wherein the fidelity-based loss is represented by the following equation:

$$F_{ij} = 1 - \left( \sqrt{P_{ij}^* \cdot P_{ij}} + \sqrt{(1-P_{ij}^*) \cdot (1-P_{ij})} \right)$$

where $F_{ij}$ represents the fidelity loss, $P_{ij}^*$ represents the target probability for documents i and j, and $P_{ij}$ represents the calculated model probability for documents i and j.

2. The method of claim 1 wherein the applying of the ranking function, the calculating of a model probability, and the calculating of a loss are performed when generating a ranking function.

3. The method of claim 2 wherein the generating of a ranking function uses an adaptive boosting technique.

4. The method of claim 2 wherein the generating of a ranking function uses a neural network technique.

5. The method of claim 2 wherein the generating of a ranking function uses a support vector machine technique.

6. The method of claim 1 wherein the calculating of a model probability applies a logistic function to the ranking of the documents.

7. A method in a computing device for determining loss between a target probability and a model probability for a pair of documents, the model probability being generated by a ranking function that ranks documents, the method comprising:

applying the ranking function to the pair of documents to provide rankings of the documents;
calculating a model probability from the rankings of the documents; and
calculating by the computing device a fidelity loss between the calculated model probability and the target probability, the fidelity loss varying between 0 and 1 and the loss being 0 when the calculated model probability is the same as the target probability
wherein the calculating of a model probability applies a logistic function to the ranking of the documents
wherein the logistic function is represented by the following equation:

$$P_{ij} = \frac{e^{o_{ij}}}{1+e^{o_{ij}}}$$

where $P_{ij}$ represents the probability that document i is ranked higher than document j and $o_{ij}$ represents the difference between outputs of a fidelity ranking function for document i and document j as represented by $f(d_i)-f(d_j)$ with $f(d_i)$ being the output of the fidelity ranking function for document i.

8. A computing device for generating a ranking function for documents, the ranking function indicating a ranking of documents based on relevance of the documents to a query, the system comprising:

a processor; and
a memory with computer-executable instructions that implement
a component that provides features of documents and indications of target probabilities of relative rankings of the relevance of pairs of documents to queries;
a component that calculates a fidelity loss between a model probability and a target probability for a pair of documents, the probabilities indicating a probability of relative ranking of the documents of the pair; and
a component that generates the ranking function by operating to minimize the fidelity loss between the model probabilities derived from the ranking of documents and the target probabilities
wherein the model probability is derived by applying a logistic function to the ranking of the documents,
wherein the logistic function is represented by the following equation:

$$P_{ij} = \frac{e^{o_{ij}}}{1+e^{o_{ij}}}$$

where $P_{ij}$ represents the probability that document i is ranked higher than document j and $o_{ij}$ represents the difference between outputs of a fidelity ranking function for document i and document j as represented by $f(d_i)-f(d_j)$ with $f(d_i)$ being the output of the fidelity ranking function for document, i and
wherein the fidelity loss is represented by the following equation:

$$F_{ij} = 1 - \left(\sqrt{P_{ij}^* \cdot P_{ij}} + \sqrt{(1-P_{ij}^*) \cdot (1-P_{ij})}\right)$$

where $F_{ij}$ represents the fidelity loss, $P_{ij}^*$ represents the target probability for documents i and j, and $P_{ij}$ represents the calculated model probability for documents i and j.

9. The computing device of claim 8 wherein the fidelity loss varies between 0 and 1 and the fidelity loss is 0 when the model probability is the same as the target probability.

10. A computing device for generating a ranking function for documents, the ranking function indicating a ranking of documents based on relevance of the documents to a query, the system comprising:
a processor; and
a memory with computer-executable instructions that implement
a component that provides features of documents and indications of target probabilities of relative rankings of the relevance of pairs of documents to queries;
a component that calculates a fidelity loss between a model probability and a target probability for a pair of documents, the probabilities indicating a probability of relative ranking of the documents of the pair; and
a component that generates the ranking function by operating to minimize the fidelity loss between the model probabilities derived from the ranking of documents and the target probabilities
wherein the fidelity loss varies between 0 and 1 and the fidelity loss is 0 when the model probability is the same as the target probability and
wherein the fidelity-based loss is represented by the following equation:

$$F_{ij} = 1 - \left(\sqrt{P_{ij}^* \cdot P_{ij}} + \sqrt{(1-P_{ij}^*) \cdot (1-P_{ij})}\right)$$

where $F_{ij}$ represents the fidelity loss, $P_{ij}^*$ represents the target probability for documents i and j, and $P_{ij}$ represents the calculated model probability for documents i and j.

11. The computing device of claim 8 wherein the component that generates a ranking function uses an adaptive boosting technique.

12. The computing device of claim 8 wherein the component that generates a ranking function uses a neural network technique.

13. The computing device of claim 8 wherein the component that generates a ranking function uses a support vector machine technique.

14. A computing device for determining loss between a target probability and a model probability for documents when training a ranking function based on training data, the training data including documents and the target probability of relative relevance of pairs of documents to queries, the model probability being generated by a ranking function that ranks documents, comprising:
a memory storing computer-executable instructions of:
a component that trains the ranking function by repeating the following until a calculated loss is below a threshold loss:
selecting a new ranking function by modifying a previous ranking function to reduce the calculated loss;
applying the new ranking function to the pairs of documents of the training data to provide new rankings of the documents based on the queries;
calculating by the computing device a model probability from the new rankings of the documents; and
calculating by the computing device a loss between the calculated model probability and the target probability to indicate a difference between the new ranking of a pair of documents represented by the calculated model probability and a ranking of the pair of documents represented by the target probability, the loss varying between 0 and 1 and the loss being 0 when the calculated model probability is the same as the target probability; and
a processor for executing the computer-executable instructions stored in the memory
wherein the calculated loss is a fidelity loss and
wherein the fidelity-based loss is represented by the following equation:

$$F_{ij}=1-(\sqrt{P_{ij}^* \cdot P_{ij}}+\sqrt{(1-P_{ij}^*) \cdot (1-P_{ij})})$$

where $F_{ij}$ represents the fidelity loss, $P_{ij}^*$ represents the target probability for documents i and j, and $P_{ij}$ represents the calculated model probability for documents i and j.

15. The computing device of claim 14 wherein the applying of the ranking function, the calculating of a model probability, and the calculating of a loss are performed when generating a ranking function.

16. The computing device of claim 15 wherein the generating of a ranking function uses an adaptive boosting technique.

17. The computing device of claim 15 wherein the generating of a ranking function uses a neural network technique.

18. The computing device of claim 15 wherein the generating of a ranking function uses a support vector machine technique.

19. The computing device of claim 14 wherein the calculating of a model probability applies a logistic function to the ranking of the documents.

* * * * *